(12) United States Patent
Alicherry et al.

(10) Patent No.: US 7,619,990 B2
(45) Date of Patent: Nov. 17, 2009

(54) TWO TIERED PACKET LABELING FOR DATA NETWORK TRACEBACK

(75) Inventors: Mansoor Ali Khan Alicherry, Scotch Plains, NJ (US); Vijay Pochampalli Kumar, Holmdel, NJ (US); Govindarasu Manimaran, Ames, IA (US); Muthuprasanna Muthusrinivasan, Ames, IA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 510 days.

(21) Appl. No.: 11/480,015

(22) Filed: Jun. 30, 2006

(65) Prior Publication Data

US 2008/0002725 A1 Jan. 3, 2008

(51) Int. Cl.
*H04L 12/28* (2006.01)
(52) U.S. Cl. ......................... 370/254; 370/392; 370/401
(58) Field of Classification Search ......... 370/252–255, 370/389, 392, 395.3, 400, 401
See application file for complete search history.

(56) References Cited

U.S. PATENT DOCUMENTS

| | | | | |
|---|---|---|---|---|
| 6,473,421 | B1 * | 10/2002 | Tappan ........................ | 370/351 |
| 6,925,081 | B2 * | 8/2005 | Meda ......................... | 370/392 |
| 7,076,559 | B1 * | 7/2006 | Ghanwani et al. ........... | 709/230 |
| 2004/0093521 | A1 * | 5/2004 | Hamadeh et al. ............ | 713/201 |
| 2005/0008015 | A1 * | 1/2005 | Meda ......................... | 370/392 |
| 2005/0226245 | A1 * | 10/2005 | Meda ......................... | 370/392 |
| 2005/0278779 | A1 * | 12/2005 | Koppol et al. ................ | 726/22 |
| 2006/0198321 | A1 * | 9/2006 | Nadeau et al. .............. | 370/254 |
| 2006/0272018 | A1 * | 11/2006 | Fouant ........................ | 726/23 |
| 2007/0206605 | A1 * | 9/2007 | Ansari et al. ............. | 370/395.5 |

OTHER PUBLICATIONS

S. Savage, et al., "Practical Network Support for IP Traceback", in Proc. ACM SIGCOMM, pp. 295-306, Aug. 2000.
S.M. Bellovin, "ICMP Traceback Messages", IETF Network Working Group, Internet Draft:draft-bellovin-itrace-00.txt, Mar. 2000.
A.C. Snoeren, et al., "Single-Packet IP Traceback", in Proc. ACM SIGCOMM, Aug. 2001.
M. Sung, et al., "IP-Traceback Based Intelligent Packet Filtering: A Novel Technique for Defending Against DDoS Attacks", in IEEE TPDS, 2003.

(Continued)

*Primary Examiner*—Hong Cho
(74) *Attorney, Agent, or Firm*—Harness, Dickey & Pierce, P.L.C.

(57) ABSTRACT

Disclosed is a two tier packet labeling technique for use in connection with network traceback in a network having multiple autonomous systems, with routers and other network resources within each autonomous system. Tier 1 labels are assigned at the autonomous system level, and tier 2 labels are assigned at the router level. In order to reduce the number of labels that are required, a technique called logical partitioned coloring may be used, in which certain autonomous systems and border routers may be logically partitioned into a plurality of mesh connected nodes, and the labels are assigned to these mesh-connected nodes. During network operation the network routers store either tier 1 or tier 2 labels in data packets. The determination of whether to store a label in any particular packet, and the determination of which label to store, may be determined probabilistically by the network router.

20 Claims, 8 Drawing Sheets

OTHER PUBLICATIONS

H. Burch, et al., "Tracing Anonymous Packets to Their Approximate Source", in Proc. UNENIX LISA, Dec. 2000.

Li, et al., "Large-Scale IP Traceback in High-Speed Internet: Practical Techniques and Theoretical Foundation", in Proc. IEEE Symp. on S&P, 2004.

A. Belenky, et al., "IP Traceback with Deterministic Packet Marking", in IEEE Communication Letters, vol. 7, No. 4, pp. 162-164, Apr. 2003.

M. Goodrich, "Efficient Packet Marking for Large Scale IP Traceback", in Proc. ACM CCS, pp. 117-126, 2002.

D. Song, et al., "Advanced and Authenticated Marking Schemes for IP Traceback", in Proc. IEEE INFOCOM, 2001.

D. Dean, et al., An Algebrac Approach to IP Traceback, in ACM TISSEC, vol. 5, No. 2, pp. 119-137, 2000.

M. Adler, "Tradeoffs in Probabilistic Packet Marking for IP Traceback", in Proc. STOC, pp. 407-418, 2002.

T. Peng, et al., "Adjusted Probabilistic Packet Marking for IP Traceback", in Proc. Networking, 2002.

B. Rizvi, et al., "Analysis of Adjusted Probabilistic Packet Marking", in Proc. IPOM, 2003.

Q. Dong, et al., "Efficient Probabilistic Packet Marking", in Proc. IEEE ICNP, 2005.

K. Park, et al., On the Effectiveness of Probabilistic Packet Marking for IP Traceback under Denial of Service Attack, in Proc. INFOCOMM, 2001.

I. Hamadeh, et al., "Performance of IP Address Fragmentation Strategies for DDoS Traceback", in Proc. IEEE IPOM, 2003.

M. Waldvogel, "*GOSSIB* vs. *IP Traceback Rumors*", in Proc. ACSAC, 2002.

M. Ma, "Tabu Marking Scheme for IP Traceback", in Proc. IEEE IPDPS, 2005.

T. Ogawa, et al., "Branch Label Based Probabilistic Packet Marking for IP Traceback", in IEEE ICON, 2003.

B. Al-Duwairi, et al., "Topology Based Packet Marking", in Proc. IEEE ICCCN, 2004.

M. Muthuprasanna, et al., "Space-Time Encoding for DDoS Attack Traceback", in Proc. IEEE GLOBECOM, 2005.

K. Choi, et al., "A Marking Scheme Using Huffman Codes for IP Traceback", in Proc. ISPAN, 2004.

C. Bai, et al., "Alegebraic Geometric Code Based IP Traceback", In Proc. IEEE IPCCC, 2004.

Y. Sawai, et al., "Performance Evaluation of Inter-Domain IP Traceback", in Proc. IEEE ICT, 2003.

V. Paruchuri, et al., "Authenticated Autonomous System Traceback", in Proc. IEEE AINA, 2004.

C. Gong, et al., "Single Packet IP Traceback in AS-Level Partial Deployment Scenario", in Proc. IEEE GLOBECOMM, 2005.

B. Al-Duwairi, et al., "Novel Hybrid Schemes Employing Packet Marking and Packet Logging for IP Traceback", in IEEE TPDS, 2005.

C. Gong, et al., "IP Traceback Based on Packet Marking and Logging", in Proc. ICC, 2005.

E. Lloyd, et al., "On the Complexity of Distance-2 Coloring", in Proc. IEEE ICCI, 1992.

S. Das, et al., "Star-Coloring of Graphs for Conflict-Free Access to Parallel Memory Systems", in Proc. IEEE IPDPS, 2004.

S. T. McCormick, "Optimal Approximation of Sparse Hessians and its Equivalence to a Graph Coloring Problem", in Mathematical Programming 26 (1983), 153-171.

A. Gebremedhin, et al., "Parallel Distance-k Coloring Algorithms for Numerical Optimization", in Proc. Euro-Par, 2002.

D. Bozdag, et al., "A Parallel Distance-2 Graph Coloring Algorithm for Distributed Memory Computers", in Proc. HPCC, 2005.

A. Yaar, et al., "FIT: Fast Internet Traceback", in.Proc. IEEE INFOCOM, 2005.

P. Mahadevan, et al., "Lessons from Three Views of the Internet Topology", CAIDA Technical Report TR-2005-02.

D. Magoni, et al., "Analysis of the Autonomous System Network Topology", in ACM CCR, Jul. 2001.

M. Fayed, et al., "On the Size Distribution of Autonomous Systems", Technical Report, Boston University, Jan. 2003.

Q. Vohra, et al., "BGP Support for Four-Octet AS Number Space", IETF Network Working Group, Internet-Draft:draft-ietf-idr-as4bytes-12.txt, Nov. 2005.

N. Spring, et al., "Measuring ISP Topologies with Rocketfuel", in Proc. ACM SIGCOMM, 2002.

H. von Schelling, "Coupon Collecting for Unequal Probabilities", in American Mathematical Monthly, 1954.

S. Lu, et al., "Filling a Penny Album", in CHANCE, 2000.

\* cited by examiner

*input:* A graph $G = (V, E)$
*output:* A coloring $c : V \rightarrow 1,2,3,...$ for $i = |V|; i > 0; i--$ do
402 $\begin{cases} v \Leftarrow \text{ vertex having least degree in the subgraph formed by unlabeled vertices} \\ \text{assign label } i \text{ to } v \\ \text{set } c(v) \Leftarrow 0 \end{cases}$
end for
for $j = largest-label; j > 0; j--$ do
404 —  $\mu \Leftarrow \phi$
  for all $v$ such that $(u, v) \in E$ do
406 —  $\mu \Leftarrow \mu \cup c(v)$
   for all $w$ such that $(w, v) \in E$ do
408 —  $\mu \Leftarrow \mu \cup c(w)$
   end for
  end for
410 —  $c(u) \Leftarrow$  least color $\notin \mu$
end for

*FIG. 4*

| AS-PATH LENGTH<br>OVERLAY HOPS (d) | 3<br>6 | 4<br>8 | 5<br>10 | 6<br>12 | 7<br>14 | 8<br>16 | 9<br>18 | 10<br>20 |
|---|---|---|---|---|---|---|---|---|
| MINIMAL TRACEBACK | 54 | 85 | 119 | 156 | 194 | 234 | 275 | 318 |
| COMPLETE TRACEBACK | 75 | 113 | 155 | 199 | 245 | 292 | 341 | 392 |

TWO TIERED PACKET LABELING FOR DATA NETWORK TRACEBACK

BACKGROUND OF THE INVENTION

The present invention relates generally to data network traceback techniques, and more particularly to data network traceback using packet labeling.

Data networks, such as the Internet, are often the target of various types of attacks. One such attack is a denial of service (DoS) attack. A DoS attack is an incident in which a user or organization is deprived of the services of a resource they would normally expect to have. The attack may be initiated, for example, by an attacker sending a large amount of data traffic (e.g., data packets) to a particular network resource (e.g., website), thereby overloading the resource. There are tools currently available that provide the ability to easily launch a widely distributed denial of service (DDoS) attack. A DDoS attack is a type of DoS attack in which the data traffic originates from various locations, making it harder to defend against. DDoS attacks may result in large financial losses to victims of the attack.

One of the problems in defending against DDoS attacks is that the attackers use incorrect or spoofed Internet Protocol (IP) addresses in the attack data packets, thereby disguising the true origin of the attacks. Due to the stateless nature and destination-oriented routing of the Internet, it is a difficult problem to determine the true source of these spoofed IP packets. This problem is called the IP traceback problem.

Various IP traceback techniques have been proposed which allow for identification of the attack path of data packets. Identification of the attack path not only allows for after-the-fact identification of the attacker, but may also allow for the initiation of mitigation steps to end the attack if the traceback process is completed quickly. The known traceback techniques generally fall into two categories, packet marking and packet logging. Packet marking techniques mark data packets with partial path information while they traverse the network en route to their destination. The marking is performed by the routers along the path. Analysis of a sufficient number of these marked packets allows a victim of a DDoS attack to reconstruct the attack path. The packet logging technique stores packet digests (i.e., hash value of invariant portion of packet header) in routers along the path of the packets. Analysis of the packet digests in neighboring routers allows for a reconstruction of the actual attack path.

Certain characteristics are desirable in a traceback technique. First, the traceback technique should be incrementally deployable, scalable, and require minimal changes to existing equipment. Further, the technique must be accurate, both in terms of identifying the true source of an attack and not incorrectly implicating innocent network hosts. In addition, the technique should require analysis of relatively few packets in order to complete the traceback process. Finally, the technique should be resistant to tampering due to spoofed information injected by the attackers or compromised network routers. While several traceback techniques have been proposed, such techniques do not sufficiently satisfy the stated requirements.

What is needed is an improved traceback technique having the above stated characteristics.

BRIEF SUMMARY OF THE INVENTION

The present invention provides an improved packet labeling (also called packet coloring) technique for use in connection with network traceback.

An embodiment of the invention utilizes a two-tier labeling technique, with a tier 1 labeling at the autonomous system level, and a tier 2 labeling at the router level. A plurality of autonomous systems within a data network are assigned tier 1 labels using a distance-k graph labeling technique. In an advantageous embodiment, k=2 such that the labeling technique is a distance-2 graph labeling technique, also known as star labeling. The border routers within the autonomous systems are assigned tier 2 labels. While the tier 2 labels may be reused among the different autonomous systems, the tier 2 labels are unique within each autonomous system.

In order to implement the present invention, certain network resources (e.g. autonomous systems and routers) within a data network must be enabled (referred to herein as traceback enabled) to implement the functions described herein. Since it is possible that not all network resources will be so enabled, an initial step may be performed in which an overlay network of traceback enabled network resources are identified. The two-tier labeling technique may then be applied to the resources of the overlay network.

In order to reduce the number of labels that are required, a technique called logical partitioned coloring may be used in accordance with an embodiment of the invention. In accordance with the logical partitioned coloring technique, the autonomous systems are logically partitioned into a plurality of mesh connected nodes, and the tier 1 labels are assigned to the mesh-connected nodes. Similarly, the border routers may also be logically partitioned into a plurality of mesh connected nodes such that the tier 2 labels are assigned to those mesh-connected nodes.

During operation, the traceback enabled network routers receive data packets and forward the data packets to a next hop router. In accordance with an embodiment of the invention, the traceback enabled routers store a label in at least a plurality of the received data packets. The label may be a first tier label associated with the autonomous system of which the router is a member, or the label may be a second tier label associated with the router itself. The determination of whether to store a label in any particular packet, and the determination of which label to store, may be determined probabilistically by the network router.

These and other advantages of the invention will be apparent to those of ordinary skill in the art by reference to the following detailed description and the accompanying drawings.

BRIEF DESCRIPTION OF THE DRAWINGS

FIG. 4 is pseudocode of an algorithm for performing star coloring on a graph;

DETAILED DESCRIPTION

Figure 1:
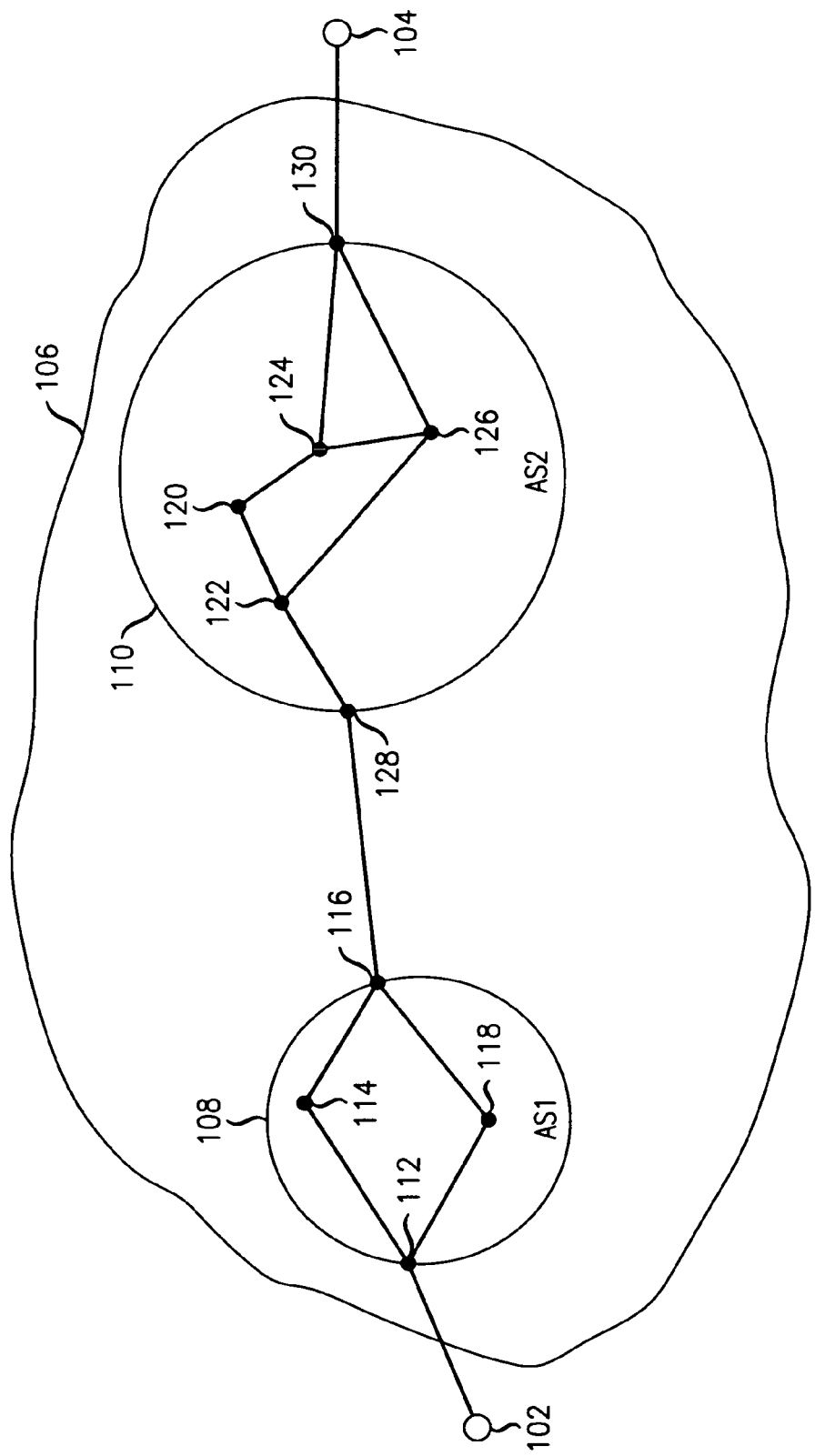
FIG. 1 shows an example network in which the principles of the present invention may be implemented.

FIG. 1 shows an example network in which the principles of the present invention may be used for IP traceback. FIG. 1 shows end user nodes 102 and 104. For example, end user nodes 102 and 104 may be end user computers or end user network servers. The end user nodes may be connected via a data network 106, such as the Internet. Data network 106 may include one or more autonomous systems (AS) such as AS1 108 and AS2 110. An autonomous system is a group of network resources (e.g., routers) that is controlled by a common network administrator on behalf of an entity (such as a university, a business enterprise, or Internet Service Provider (ISP)). An autonomous system is also sometimes referred to as a routing domain. As shown in FIG. 1, routers 112-118 are within AS1 108, and routers 120-130 are within AS2 110. Routers 112 and 116 within AS1 108 are border routers, as they transport data packets across the boundary of the AS1 108. Similarly, routers 128 and 130 are border routers of AS2 110.

The IP traceback problem may arise, for example, if end user node 104 initiates a DDoS attack against end user node 102 utilizing incorrect or spoofed Internet Protocol (IP) addresses in the attack data packets, thereby disguising the true origin of the attacks. Upon detection of an attack, the administrators of end user node 102 would try to identify the source of the attack data packets. However, such identification is difficult because the incorrect or spoofed IP addresses disguise the true origin of the attacks. The present invention provides an improved technique for tracing IP data packets back to their source, even when the source IP address in the data packets has been disguised.

In accordance with an embodiment of the invention, a packet labeling technique is used in which data packets are labeled by routers as the data packets traverse the network from their source to their destination. The labels are reused among the various network routers, which requires fewer bits within the data packets for the marking as compared to assigning unique labels to each router. The embodiment also utilizes a two-tier labeling technique, with a tier 1 labeling at the AS level, and a tier 2 labeling at the router level.

Figure 2:
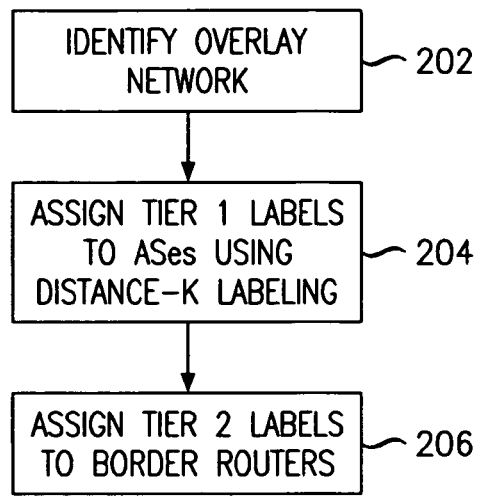
FIG. 2 is a flowchart of the steps performed to assign labels to network resources.

A high level flowchart of the steps performed to assign labels to the network resources (e.g., ASes and routers) is shown in FIG. 2. First, in step 202, an overlay network is identified. In step 204, tier 1 labels are assigned to the ASes using a distance-k labeling technique. In step 206, tier 2 labels are assigned to the border routers of the ASes labeled in step 204. Further details of each of the steps is as follows.

Figure 3A:
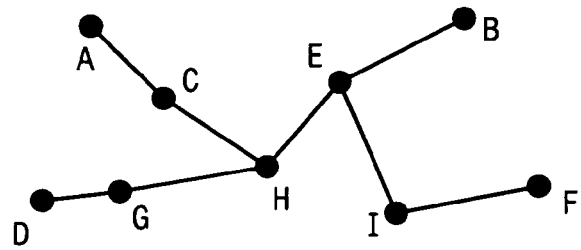
FIG. 3A shows a network graph representing a network with 9 nodes.
Figure 3B:
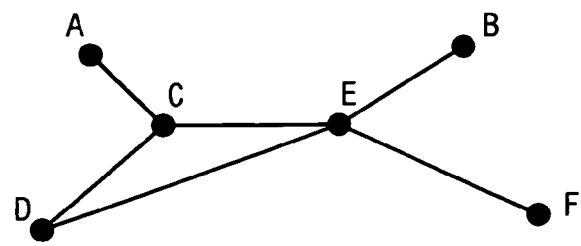
FIG. 3B shows an overlay network graph of the network of FIG. 3A.

In step 202, an overlay network of ASes is identified. With respect to the overlay network, consider the network shown in FIG. 3A. The physical topology consists of 9 nodes labeled (A, B, C, . . . , I), each representing an AS of a data network. Assume that only 6 of the ASes, as represented by the nodes labeled (A, B, C, D, E, F), have been configured to operate in accordance with the IP traceback technique described herein (i.e., they are traceback enabled). This is a likely scenario, especially in the case where the overall data network is the Internet. In such a case, it is unlikely that all ASes that make up the Internet will adopt the traceback technique described herein, and thus only a subset of all the ASes will be appropriately configured. These nodes (A, B, C, D, E, F) form a logical topology, also called an overlay network, on top of the physical network, which is shown in FIG. 3B. Since many overlay topologies may be constructed for a given physical topology, in one embodiment the overlay network is restricted by requiring every link in the overlay network to not pass through a node in the physical topology that is also part of the overlay network. Stated another way, all disjoint shortest paths between the overlay nodes in the physical topology are included as links in the overlay topology. As shown, a direct link from node A to node E does not exist in the overlay network since a packet transmission from node A to node E would pass through node C in the physical network, and C itself is an overlay node. Similarly, a direct link from node D to node E does exist in the overlay network because nodes G and H are not in the overlay. Such a restriction ensures that any packet transmission in the physical network is entirely captured in the overlay network. Additionally, there are no redundant overlay links that do not correspond to packet transmissions in the physical network. Although multiple such overlay networks might exist, uniqueness can be achieved by allowing only shortest path packet transmission in the physical network. The use of a logical overlay network allows coexistence of both traceback enabled and non-traceback enabled routers. This allows for partial and incremental deployment of the traceback techniques described herein. As new ASes become traceback enabled, the logical overlay network can be restructured.

In step 204 (FIG. 2), tier 1 labels are assigned to the ASes of the overlay network using a distance-k labeling technique. Graph labeling is a well known topic in graph theory. It is noted here that graph labeling is also referred to herein (and in the art) as graph coloring. The term graph coloring refers to the assignment of a label to elements of a graph, where those labels represent colors. One skilled in the art will recognize that the use of colors is merely a convenient way to describe the more general concept of graph labeling. As used herein, the term graph coloring is to be understood to include the more general concept of graph labeling where the labels may be any type of identifier, not just colors. However, graph coloring is used herein for ease of discussion and to conform to certain well known graph theory terminology and techniques. The following definitions are provided in order to further describe graph labeling and graph coloring.

Graph Coloring: A graph coloring of a graph G is an assignment of colors or labels, generally taken to be consecutive integers starting from 0 without loss of generality, to certain objects in G, namely vertices, edges, faces, or a combination of them.

Vertex Coloring: A vertex coloring of a graph G is a graph coloring of G where the colors are assigned only to the vertices of the graph.

Proper Coloring: A proper coloring of a graph G is a vertex coloring of G such that no two adjacent vertices in G are assigned the same color.

Distance-k Coloring: A distance-k coloring of a graph G is a proper coloring of G such that no two vertices have the same color if the shortest path between them is less than or equal to k-hops.

Star Coloring: A star coloring of a graph G is a proper coloring of G such that no path of length three in G is bi-colored. It is also called the Distance-2 coloring problem.

In star coloring, not only do adjacent vertices in the graph have different colors, but also vertices that are adjacent to a (common) third vertex also have different colors. Stated differently, for every vertex in the graph, a unique color is assigned to itself and to all its 1-hop neighbors.

Step 204 of the algorithm of FIG. 2 requires that the nodes in the overlay network (representing the IP traceback enabled ASes) be assigned labels using star coloring (i.e., distance-2 coloring/labeling). Various algorithms are known in the art for performing star coloring on a graph. Pseudocode for one such algorithm is shown in FIG. 4. Step 402, in the first for loop, assigns a sequence of numbers or labels to each vertex of the graph. The sequence for coloring ensures that a minimum number of colors is used for the given topology. Step 404, in the second for loop, assigns a color to the vertex in the order that it was labeled in step 402. Step 406, in the outer for-all loop, records all the colors of a vertex's neighbors. Step 408, in the inner for-all loop, records all the colors of the neighbors' neighbors (i.e., 2-hop neighbors of the original vertex). Step 410 assigns the smallest color not recorded in steps 406 and 408. Further details of this algorithm can be found in E. Lloyd, S. Ramanathan, "On the complexity of distance-2 coloring", in Proc. IEEE ICCI, 1992, which is incorporated by reference herein. In alternate embodiments, the assignment of labels may be implemented in a distributed manner, as is well known in the art.

It is noted that assignment of a label to an AS means that each traceback enabled router within the AS is assigned the tier 1 label. For example, referring to FIG. 1, a tier 1 label assigned to AS1 108 means that each of the routers 112, 114, 116, 118 would be assigned that tier 1 label. Similarly, a tier 1 label assigned to AS2 110 means that each of the routers 120, 122, 124, 126, 128, 130 would be assigned that tier 1 label.

In step 206, tier 2 labels are assigned to the border routers of the ASes labeled in step 204. In this step, each of the border routers of a particular AS are assigned a unique label. Thus, while tier 2 labels can be reused for border routers of different ASes, all the border routers within a particular AS are assigned a unique label.

Figure 5:
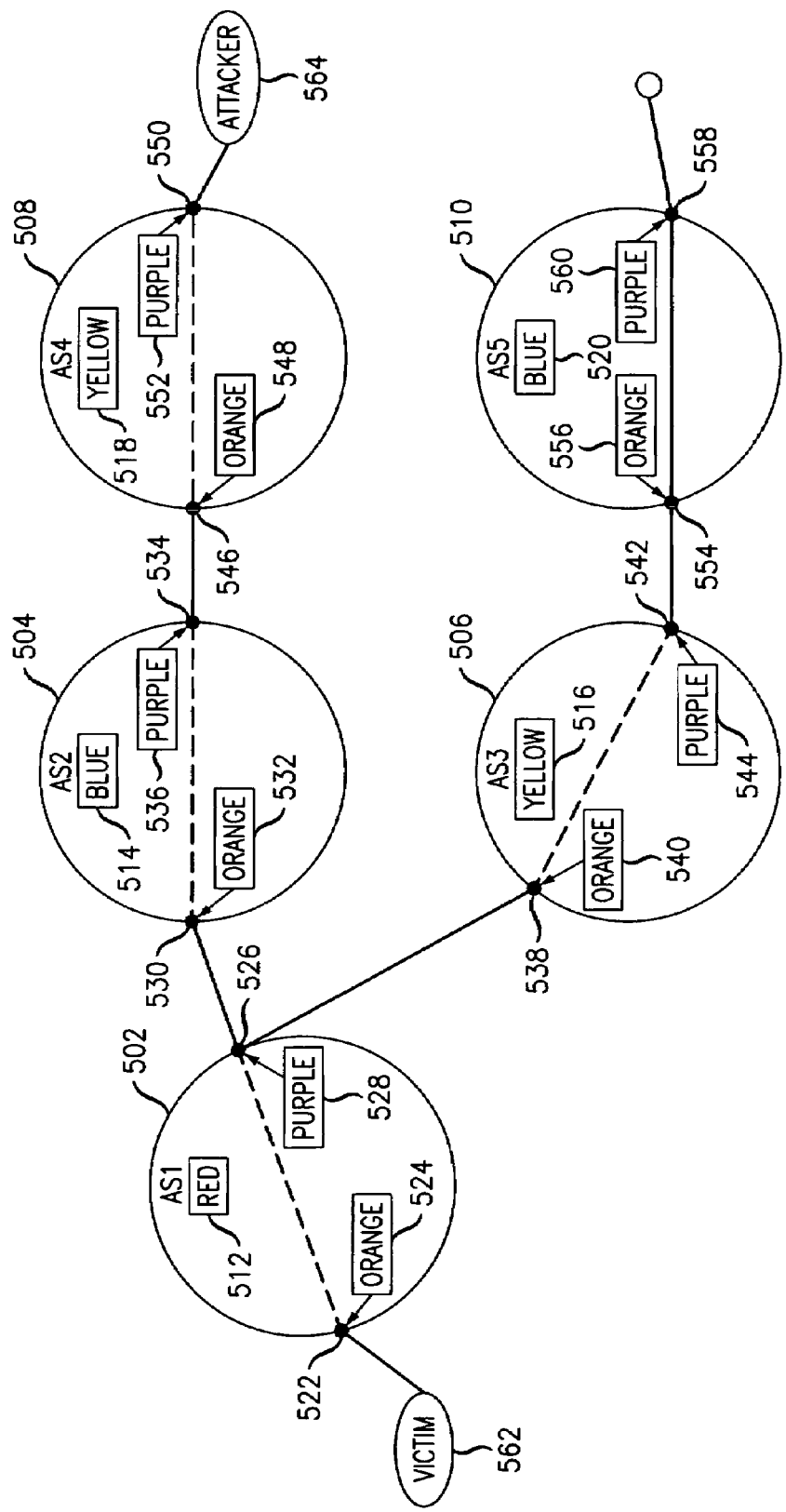
FIG. 5 shows an example network with resources labeled using two tiered traceback labeling.

This two-tiered traceback labeling architecture is shown in FIG. 5. The first tier labeling (labeling of ASes) shows AS1 502 with first tier label of red 512, AS2 504 with a first tier label of blue 514, AS3 506 with first tier label of yellow 516, AS4 508 with a first tier label of yellow 518, and AS5 510 with a first tier label of blue 520. As described above, this first tier labeling is a distance-2 labeling. Also as described above, this first tier labeling means that each of the traceback enabled routers within each of the ASes is assigned this tier 1 label. The tier 1 labels are shown in FIG. 5 only at the AS level for ease of reference. The second tier labeling (labeling of border routers) shows border routers 524 and 526 of AS1 with second tier labels of orange 524 and purple 528 respectively, border routers 530 and 534 of AS2 with second tier labels of orange 532 and purple 536 respectively, border routers 538 and 542 of AS3 with second tier labels of orange 540 and purple 544 respectively, border routers 546 and 550 of AS4 with second tier labels of orange 548 and purple 552 respectively, and border routers 554 and 558 of AS5 with second tier labels of orange 556 and purple 560 respectively. Thus, as can be seen, the tier two labeling reuses labels between ASes, but the tier two labels within any particular AS are unique. It is noted that in this FIG. 5, only the border routers are shown within any particular AS, and the internal routers are not shown (the internal paths are represented by dotted lines).

The use of the above described two tier labeling technique allows for certain identification of a network path, given a known sequence of labels traversed by data packets. For example, consider the example shown in FIG. 5 where a victim node 562 is being attacked by an attacker node 564 with a DDoS attack. Upon receipt of a sufficient number of labeled packets, the victim 562 can determine the path traversed by the attack packets. If the path labels indicate that the attack packets are traversing a path having labels yellow, blue, red, then it can be determined by the victim, by analyzing the reverse path (red, blue, yellow), that the path from the victim 562 to the attacker 564 is AS1 (red label 512), AS2 504 (blue label 514), AS4 508 (yellow label 518). When it is determined that AS4 508 is the last AS in the path closest to the attacker 564, then the tier 2 labels can be analyzed to determine that the border router 550 was the border router closest to the attacker 564. Thus, the tier 2 labels may be used to distinguish multiple peering (i.e., connection) points between two ASes. Additionally, it is possible that routers in an AS are not traceback enabled, but have other packet dropping or filtering capabilities. These routers could use routing information known to the AS and the tier 2 labels to design appropriate mitigation filters to mitigate a DDoS attack. There may be more than one intra-AS path between two border routers, and the tier 2 information provides information to allow for deployment of the mitigation filters along the different paths.

Figure 6:
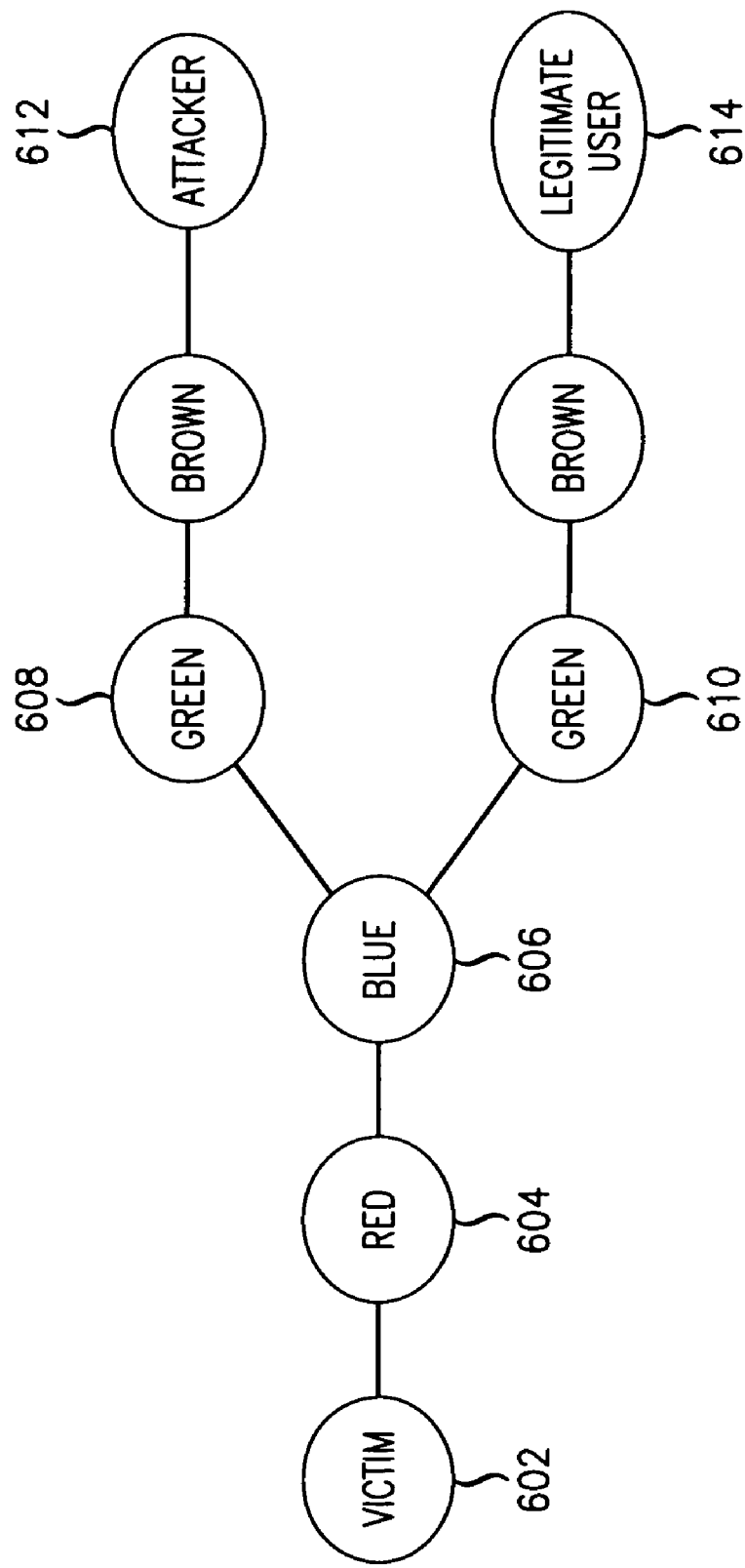
FIG. 6 is an example overlay network graph.

If the tier 1 labeling was not performed according to the distance-2 (star coloring) requirement, then the above analysis could not be carried out. This is illustrated in the example overlay network graph shown in FIG. 6. For example, assume that victim node 602 receives packets and identifies a reverse path of red, blue, green, brown as the color chain to an attacker. In this case, the victim 602 could identify node 604 from the red label and node 606 from the blue label. However, after identification of node 606, the next label of green would be inconclusive in identifying the next label, because either node 608 or 610 could be the next node in the chain. Thus, the color chain is inconclusive and could either accurately identify the attacker 612 as the source of the attack or inaccurately identify legitimate user 614 as the source of the attack.

Figure 7A:
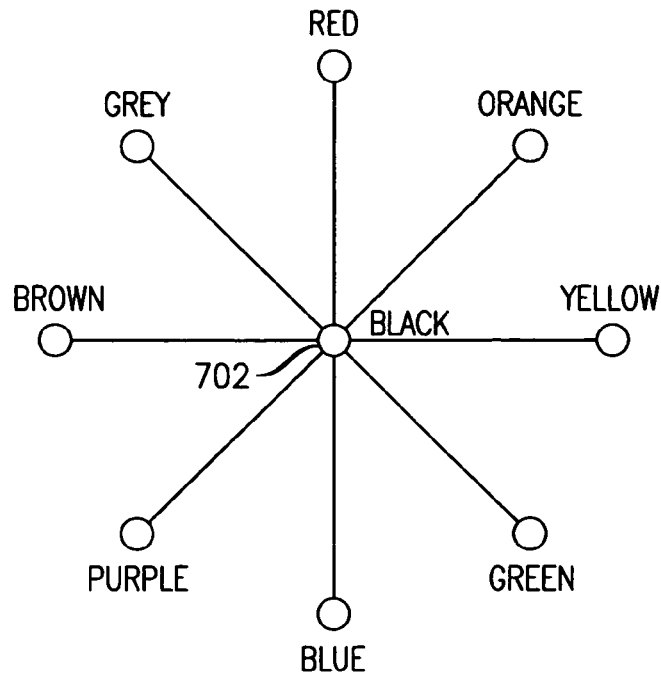
FIG. 7A shows an example overlay network graph.
Figure 7B:
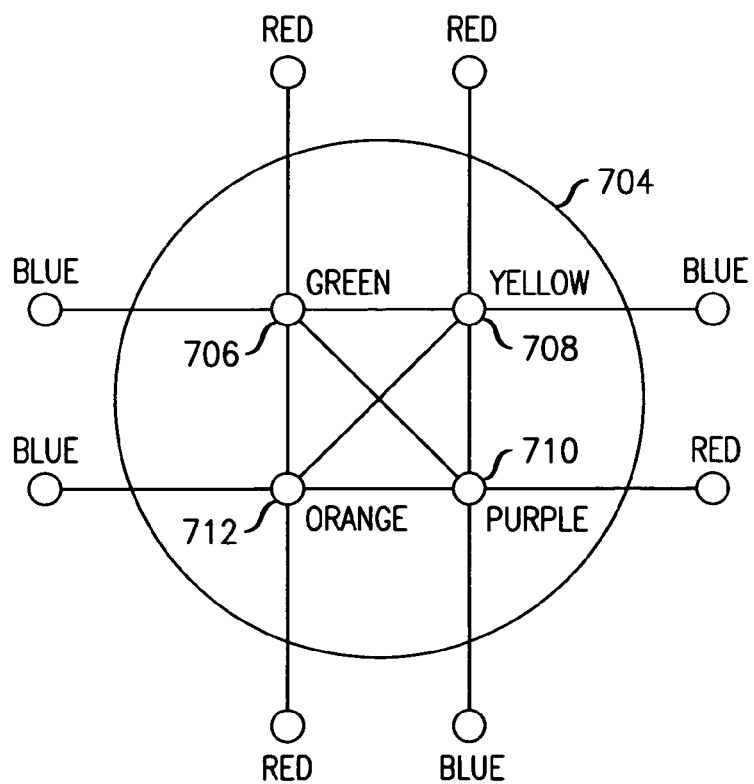
FIG. 7B shows an example overlay network graph after logical partitioned coloring is applied to the overlay network graph of FIG. 7A.

Although utilizing star coloring for the tier 1 labeling provides benefits as described above, a potential problem with star coloring is the number of unique colors (i.e., labels) that are required for the star coloring. As would be recognized by one skilled in the art, the number of unique colors required is determined by the degree of the nodes in the graph. If there are high degree nodes in the graph, then a large number of unique colors is required. This, in turn, would require the use of a large number of bits in the marked data packets to represent the different colors. As an example, consider the overlay network shown in FIG. 7A. Node 702 has 8 neighbors (degree 8) and a minimum of 9 colors would be required to label this graph using star coloring as shown in FIG. 7B. This would require 4 bits in the marked data packets. However, using a technique called logical partitioned coloring in accordance with an embodiment of the invention, the required number of unique colors can be reduced. In accordance with the logical partitioned coloring technique, the high degree nodes in the graph are replaced with a logical set of mesh-connected nodes. For example, as shown in FIG. 7B, node 702 has been replaced with a logical set of four nodes, as identified within circle 704. As seen in FIG. 7B, using logical partitioned coloring only 6 unique colors are required for the star coloring. This would require only 3 bits in the marked data packets. This reduction in the required number of colors is possible because logical partitioned coloring increases every 3-hop path to a 4-hop path in the vicinity of the partitioned node, and therefore allows for a greater spatial reuse of the colors. Thus, all neighbors of node 702 can be labeled using the smaller set of colors.

The concept of logical partitioned coloring can be generalized as follows. Let a node having degree t be logically partitioned into p mesh-connected nodes. We assume that the original neighbors are now uniformly distributed to the different logical nodes, and hence the effective node degree is now reduced to t/p. The number of colors required for simple star coloring is given by:

$$\Omega(t) \leq \chi(G) \leq O(t^2)$$

and the number of colors required for (p,t) (logical) partitioned coloring is given by:

$$\Omega\left(p + \left\lceil \frac{t}{p} \right\rceil\right) \leq \chi(G) \leq O(t^2)$$

In the embodiment described herein, in which the tier 1 labels are applied to the ASes, an AS can be logically partitioned by logically grouping together border routers of the AS and assigning a color to these groups. For example, referring to FIGS. 7A and 7B, assume that an AS was associated with node 702 in the graph of FIG. 7A. In performing the logical partitioned coloring, one group of border routers of the AS could be associated with node 706 and assigned a tier 1 label of green, another group of border routers of the AS could be associated with node 708 and assigned a tier 1 label of yellow, another group of border routers of the AS could be associated with node 710 and assigned a tier 1 label of purple, and another group of border routers of the AS could be associated with node 712 and assigned a tier 1 label of orange.

Although logical partitioned coloring reduces the required number of bits for marking, the number of packets required for traceback is increased slightly. This is a result of having more logical nodes than physical nodes along the attack path that color the packets. Let there be k routers on the attack path, m of which are logically partitioned. The number of colors that are required at the victim for successful traceback is now increased as shown in the following equation:

$$\frac{\text{star coloring}}{\text{logical partitioned coloring}} = \frac{(k) \text{ color path}}{(k+m) \text{ color path}}$$

as every packet entering a node in the overlay now has 2 logical colors marked on it, namely the ingress color and the egress color. A packet traverses only two logical groups in each AS, an ingress group and an egress group corresponding to the groups in which the ingress and egress routers lie. Thus, if non-border routers are also traceback enabled, then the number of required colors increases in each AS.

Since the border routers are assigned unique tier 2 labels, logical partitioning at the tier 2 level is not required. However, there are secondary benefits to performing logical partitioning at the tier two level. For example, such logical partitioning could allow for identification of attack interfaces at a finer granularity. This may be useful to quickly develop mitigation filters along the paths linking the interfaces, rather than applying mitigation filters along intra-AS paths between two border routers.

Figure 8:
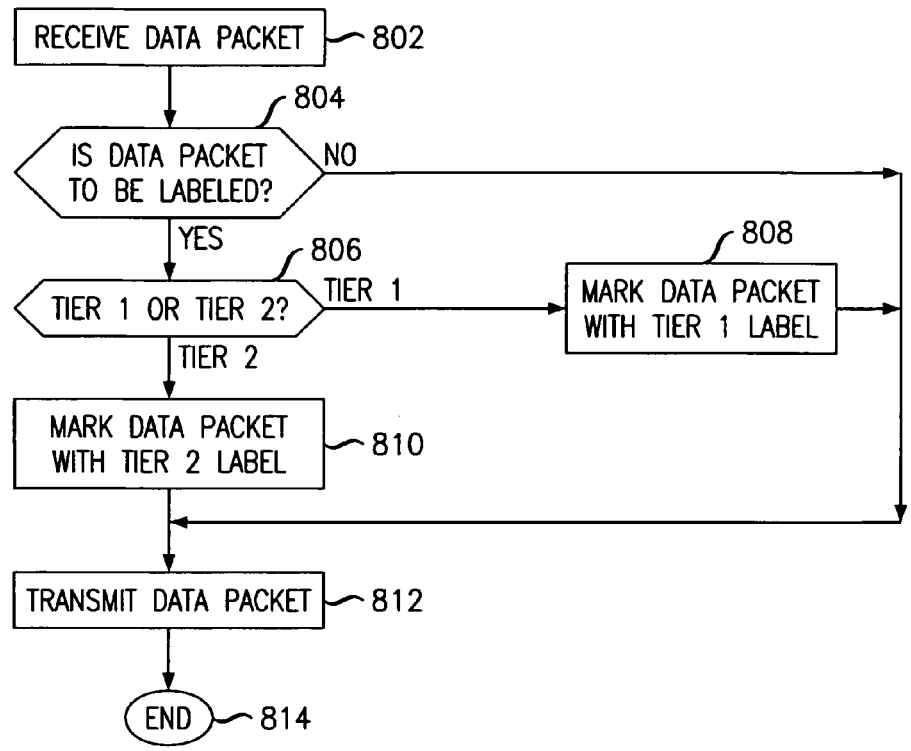
FIG. 8 is a flowchart of the steps performed by a traceback enabled router.

Having described the tier 1 and tier 2 labeling, the operation of a traceback enabled network router in accordance with an embodiment of the invention will now be described in conjunction with the flowchart of FIG. 8. First, in step 802, the network router receives a data packet to be routed via the data network. In step 804 it is determined whether the data packet is to be labeled. This step 804 is performed because not every packet that is handled by a traceback enabled router is marked. Instead, the determination as to whether a packet is marked is performed probabilistically. More particularly, in one embodiment of the invention, the probability (p) that a received packet is marked is determined according to:

$$p = \frac{1}{d}$$

where d is the number of hops. In one embodiment, p is static with the value of d being in the range 25-30. Further details regarding the determination of the probability p is provided below. If the determination as to whether to mark a data packet in step 804 is no, then control passes to step 812 where the router transmits the data packet to the next router on the path in a convention manner. Otherwise, in step 806 it is determined whether to mark the packet with the tier 1 or tier 2 label associated with the router. In an advantageous embodiment, this determination is made such that 50% of the packets are labeled with a tier 1 label, and 50% of the packets are labeled with a tier 2 label. Further details regarding the probabilities for labeling with a tier 1 or tier 2 label is provided in further detail below.

If the router determines in step 806 that a tier 1 label is to be assigned to the data packet, then the data packet is marked with the tier 1 label assigned to this router in step 808. If the router determines in step 806 that a tier 2 label is to be assigned to the data packet, then the data packet is marked with the tier 2 label assigned to this router in step 810. Following steps 804, 808 and 810, the data packet is transmitted to the next hop router in step 812. Processing ends in step 814.

Figure 9:
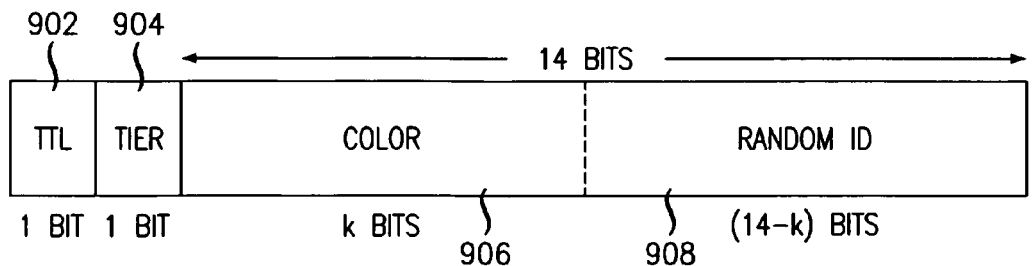
FIG. 9 shows the 16-bit IP identification field of an IP data packet header.

The specific protocol for labeling a data packet in accordance with one embodiment of the invention will now be described in conjunction with FIG. 9. FIG. 9 represents the 16-bit IP Identification field in the header of an IP data packet. While the embodiment being described utilizes this portion of a standard IP data packet, it is to be understood that any other portion of a data packet may be used instead. Further, while 16 bits are used in accordance with this particular embodiment of the invention, more or less bits may be used in alternate implementations. As shown in FIG. 9, 1-bit tier field 904 is used to denote which type of label, tier 1 or tier 2, is stored in the data packet. For example, a bit value of "0 could indicate tier 1 and a bit value of "1" could indicate tier 2. A k-bit color field 906 is used for marking the color associated with the appropriate tier of the router performing the labeling. The size of this field is implementation specific, and may be variable to allow for scalability. It is advantageous to use a sufficiently large number of bits to avoid frequent growth in the size of this field. If the size of the overlay network were to grow in such a way that it requires an increase in the size of this field, the size of this field may be altered for only any newly joining nodes. The use of variable field lengths thus allows for minimal changes over time, scalability and incremental deployment.

A 1-bit TTL field 902 is used for the distance metric which indicates the distance (i.e., number of hops) from the victim to the router that marked the packet, in accordance with the well known TTL-based distance measurement technique described in A. Yaar, A. Perrig, D. Song, "FIT: Fast Internet Traceback" in Proc. IEEE INFOCOM, 2005, which is incorporated herein by reference.

Since there may exist multiple nodes having the same color label at a particular distance from a victim node, a random number may be used to distinguish between these different nodes. As shown in FIG. 9, the remaining (14−k) bits are used as a random number field 908 for storing a random number generated by the network router. This random number is generated by the traceback enabled routers as a one-time process and is kept constant. Alternatively, the random number may be generated by the network operator. The random ID and distance metric can be used to associate the 2 (tier) colors of a particular router that arrive in different packets. Thus, the combination of the TTL information 902, the tier bit 904, the marked color 906 and the random ID 908 allows for an identification of a particular AS (tier 1) or router (tier 2).

If a victim detects a DDoS attack, the labels stored in the data packets by the traceback enabled routers may be used to both determine the source of the attack as well as to take steps to mitigate the attack. Various techniques exist for tracing the source of data packets given label information as provided in accordance with the principles of the present invention as described above. For example, one such technique is described in A. Yaar, A. Perrig, D. Song, "FIT: Fast Internet Traceback" in Proc. IEEE INFOCOM, 2005. It is assumed that the victim has an overlay network map to allow for successful traceback. As explained in "FIT: Fast Internet Traceback", when receiving packet markings from the same distance and TCP connection, an endhost can assume that the markings come from the same router in the data network. However, as opposed to the FIT algorithm, a traceback technique that is used in conjunction with the labeling techniques of the present invention does not attempt to associate an IP address with every identified router, but instead the path information (i.e., sequence of colors/labels) is stored as an attack tree rooted at the endhost. The attack tree may then be used in conjunction with an overlay network map in order to reconstruct the attack path during traceback. If the attack is ongoing, a pushback mechanism can be used to throttle traffic at upstream routers in order to mitigate the effects of the attack.

Figures 10, 11:
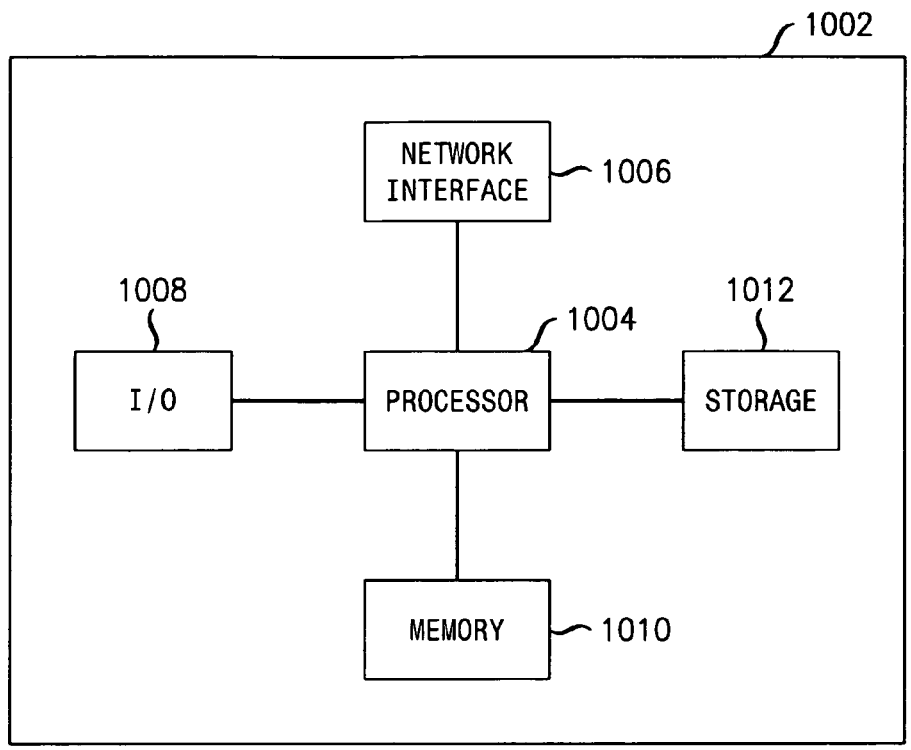
FIG. 10 is a high level block diagram of a computer.
FIG. 11 is a table showing the number of packets required for minimal and complete traceback.

The routers described herein are well known in the art for routing data packets in a data network. Such routers may be implemented, for example, using well known computer processors, memory units, storage devices, computer software, and other components. In addition, the various methods described herein may also be performed by an appropriately configured computer. A high level block diagram of a computer which may be used to implement the routers, or to perform the processing described herein, is shown in FIG. 10. Computer 1002 contains a processor 1004 which controls the overall operation of computer 1002 by executing computer program instructions which define such operation. The computer program instructions may be stored in a storage device 1012 (e.g.; magnetic disk) and loaded into memory 1010 when execution of the computer program instructions is desired. Thus, the operation of the computer will be defined by computer program instructions stored in memory 1010 and/or storage 1012 and the operation of the computer will be controlled by processor 1004 executing the computer program instructions. Computer 1002 also includes one or more network interfaces 1006 for communicating with other devices via a network. Computer 1002 also includes input/output 1008 which represents devices which allow for user interaction with the computer 1002 (e.g., display, keyboard, mouse, speakers, buttons, etc.). One skilled in the art will recognize that an implementation of an actual computer will contain other components as well, and that FIG. 10 is a high level representation of some of the components of such a computer for illustrative purposes. One skilled in the art will also recognize that dedicated hardware could be substituted for software, and that the functions described herein could be implemented using various combinations of hardware and software.

Having provided above a description of various embodiments of the invention, a further theoretical analysis of traceback in accordance with these embodiments is provided below. There are two types of traceback that are possible using the above described 2-tier labeling: minimal traceback and complete traceback. Minimal traceback is the identification of an attack path using the tier 1 labels only. Minimal traceback identifies an AS-level attack path. Minimal traceback does not identify the intra-AS path or, in the case of multiple peering points, the inter-AS path. Complete traceback is the identification of an attack path using both the tier 1 and tier 2 labels. Complete traceback identifies the entire attack path. Minimal traceback almost always finishes faster than a complete traceback because fewer packets as required for successful minimal traceback. Thus, minimal traceback can be viewed as a preview to the complete traceback information.

Let us assume that there are routers along the (overlay) attack path from the attacker to the victim, where each router has a probability of p that it will mark any given data packet. Given that a router has chosen to mark a particular packet, let the probability of marking a tier 1 label be q, and consequently the probability of marking a tier 2 label be (1−q). Let us denote by $P_i(M)$, $P_i(M_1)$ and $P_i(M_2)$ the probability that the packet received at the victim is marked, is marked with a tier 1 label, and is marked with a tier 2 label, respectively, by a router i (overlay) hops from the victim. The expressions $P_i(M)$, $P_i(M_1)P_i(M_2)$, are given by equations 1, 2 and 3 respectively.

$$P_i(M) = p(1-p)^{i-1} \tag{1}$$

$$P_i(M_1) = pq(1-p)^{i-1} \tag{2}$$

$$P_i(M_2) = p(1-q)(1-p)^{i-1} \tag{3}$$

Now assume that the (marked) packets from all the d routers appear with the same likelihood as the furthest router. Since these probabilities are disjoint, the probability that a given packet will deliver a mark from some router is P(M) (equation 4). Similarly, the probability that a given packet will deliver a tier 1 (tier 2) mark from some router is $P(M_1)$ ($P(M_2)$), as in equations 5 and 6 respectively.

$$P(M) \geq dp(1-p)^{d-1} \tag{4}$$

$$P(M_1) \geq dpq(1-p)^{d-1} \tag{5}$$

$$P(M_2) \geq dp(1-q)(1-p)^{d-1} \tag{6}$$

Now consider the Generalized Coupon Collector Problem in probability theory, as described in H. von Schelling, "Coupon Collecting for Unequal Probabilities", in American Mathematics Monthly, 61:306-311, 1954 and S. Lu, S. Skiena, "Filling a Penny Album", In CHANCE, 13(2):25-28, 2000, which examines the problem of sampling with replacement from a population of k different items until, and only until, all k items are represented in the sample. If every item has an associated probability $p_i$ with which it will be selected on any draw, then it gives a bound on the expected size of the sample. For the 2-tier traceback technique, the sample space consists of the d tier 1 labels and the d tier 2 labels. The tier 1 labels are chosen with probability q, while the tier 2 labels are chosen with probability (1−q). The minimal traceback consists of obtaining the tier 1 labels, while the complete traceback consists of obtaining the entire set of 2d labels.

For minimal traceback, let $X_m^I$ denote the number of trials required to select one of each of the d equi-probable tier 1 labels. The expression for $E[X_m^I]$ is given in equation 7, in accordance with the Generalized Coupon Collector Problem discussed above. Therefore, the number of packets, $X_m$, required to reconstruct an AS-path of length d has the bounded expression as in equation 8.

$$E[X_m^1] = d \sum_{i=1}^{d} \frac{1}{i} \approx d\ln(d) + U(1) \quad (7)$$

$$E[X_m] < \frac{\ln(d)}{pq(1-p)^{d-1}} \quad (8)$$

For complete traceback, let $X_c^1$ denote the number of trials required to select one of each of the d equi-probable labels of tier 1 and d equi-probable labels of tier 2.

The expression for $E[X_c^1]$ is given in equation 9 (to the second approximation in the Generalized Coupon Collector Problem).

$$E[X_c^1] \approx \sum_{1 \leq i_1 \leq 2d} \frac{1}{p_{i_1}} - \sum_{1 \leq i_1 \leq i_2 \leq 2d} \frac{1}{p_{i_1} + p_{i_2}} \quad (9)$$

where $p_i = q (\forall\ 1 \leq i \leq d),$ and $p_i = (1-q)(\forall\ (d+1) \leq i \leq 2d)$ However, both the tier 1 and tier 2 labels are equally important in obtaining the complete information about the attack path, and hence we now make the simplifying assumption that $$q = \frac{1}{2}.$$

If $$q > \frac{1}{2},$$

the minimal traceback would finish earlier, but the complete traceback process would take much longer. Similarly, if $$q < \frac{1}{2},$$

the minimal traceback would take longer to finish. As we would ideally like to minimize the finish time for minimal traceback, and then subsequently minimize the time taken for complete traceback, we choose the optimal value of q to be ½. The above expression in equation 9 consequently reduces to equation 10. Therefore, the number of packets, $X_c$, required for the victim to reconstruct the entire attack path of length d has the bounded expression as in equation 11. The value of p, that minimizes the number of packets required for attack path reconstruction is given by equation 12.

$$E[X_c^1] = 2d \sum_{i=1}^{2d} \frac{1}{i} \approx 2d\ln(2d) + O(1) \quad (10)$$

-continued $$E[X_c] < \frac{2\ln(2d)}{p(1-p)^{d-1}} \quad (11)$$

$$p = \frac{1}{d} \text{(for minimal \& complete traceback)} \quad (12)$$

The table shown in FIG. 11 shows the number of packets required for minimal traceback and complete traceback given certain AS-path length and overlay hops (d). The 2-tier labeling technique described herein, along with star coloring of the traceback overlay, provides significant improvement over prior art traceback techniques. Most of the traditional prior art traceback schemes require thousands of packets, while even the best known schemes require hundreds of packets. For an AS path length of 5, the technique described herein requires approximately 119 packets for minimal traceback, and approximately 155 packets to perform complete traceback.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for operation of a network router within an autonomous system comprising:
   receiving data packets;
   storing a label in at least a plurality of said data packets, said label chosen from a group comprising a first tier label associated with said autonomous system and each router within said autonomous system, and a second tier label associated with said network router; and
   transmitting said data packets to another network router.

2. The method of claim 1 further comprising the step of:
   storing a random identifier associated with said network router in said plurality of data packets.

3. The method of claim 1 further comprising the step of:
   determining probabilistically whether a label is to be stored in a data packet.

4. The method of claim 1 further comprising the step of:
   determining probabilistically whether said first tier or said second tier label is stored in said data packet.

5. The method of claim 1 wherein said first tier label is pre-assigned to said autonomous system utilizing distance-k labeling.

6. The method of claim 5 wherein k=2.

7. A method for assigning network traceback Labels comprising the steps of:
   assigning at least one tier 1 label to each of a plurality of autonomous systems utilizing distance-k labeling; and
   assigning at least one tier 2 label to each border router within said autonomous systems, each of said tier 2 labels being unique within a particular autonomous system.

8. The method of claim 7 further comprising:
   assigning a plurality of tier 1 labels to at least one of said autonomous systems.

9. The method of claim 8 wherein said step of assigning a plurality of tier 1 labels to at least one of said autonomous systems comprises:
    logically partitioning said at least one of said autonomous systems into a plurality of mesh connected nodes; and
    assigning a different tier 1 label to each of said mesh connected nodes.

10. The method of claim 9 wherein said step of assigning a plurality of tier 1 labels to at least one of said autonomous systems further comprises:
    associating each of said plurality of mesh connected nodes with at least one border router in said at least one of said autonomous systems.

11. The method of claim 7 further comprising:
    assigning a plurality of tier 2 labels to at least one of said border routers.

12. The method of claim 11 wherein said step of assigning a plurality of tier 2 labels to at least one of said border routers comprises:
    logically partitioning said at least one of said border routers into a plurality of mesh connected nodes; and
    assigning a different tier 2 label to each of said mesh connected nodes.

13. The method of claim 12 further comprising the step of:
    associating each of said plurality of mesh connected nodes with at least one interface of said at least one of said border routers.

14. The method of claim 7 further comprising the step of:
    identifying an overlay network comprising said plurality of autonomous systems.

15. The method of claim 7 wherein k=2.

16. A network router associated with an autonomous system, said network router comprising:
    means for receiving data packets;
    means for storing a label in at least a plurality of said data packets, said label chosen from a group comprising a first tier label associated with said autonomous system and each router within said autonomous system, and a second tier label associated with said network router; and
    means for transmitting said data packets to another network router.

17. The network router of claim 16 further comprising:
    means for storing a random identifier associated with said network router in said plurality of data packets.

18. The network router of claim 16 further comprising:
    means for determining probabilistically whether a label is to be stored in a data packet.

19. The network router of claim 16 further comprising:
    means for determining probabilistically whether said first tier or said second tier Label is stored in said data packet.

20. The network router of claim 16 wherein said first tier label is pre-assigned to said autonomous network utilizing distance-k labeling.

* * * * *

UNITED STATES PATENT AND TRADEMARK OFFICE
CERTIFICATE OF CORRECTION

PATENT NO.      : 7,619,990 B2                                                               Page 1 of 1
APPLICATION NO. : 11/480015
DATED           : November 17, 2009
INVENTOR(S)     : Alicherry et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 650 days.

Signed and Sealed this

Fourteenth Day of December, 2010

David J. Kappos
*Director of the United States Patent and Trademark Office*